United States Patent [19]

Chiponis

[11] Patent Number: 4,774,768
[45] Date of Patent: Oct. 4, 1988

[54] COPLANARITY TESTER FOR SURFACE MOUNTED DEVICE

[75] Inventor: Lawrence J. Chiponis, San Jose, Calif.

[73] Assignee: AllTeq Industries, Fremont, Calif.

[21] Appl. No.: 38,305

[22] Filed: Apr. 14, 1987

[51] Int. Cl.$^4$ .............................................. G01B 7/02
[52] U.S. Cl. .................................... 33/533; 33/1 BB; 33/645
[58] Field of Search ............... 33/552, 1 BB, 533, 613, 33/655, 645

[56] References Cited

U.S. PATENT DOCUMENTS

| | | | |
|---|---|---|---|
| 2,892,257 | 6/1959 | Tandler et al. | 33/552 |
| 3,724,084 | 4/1973 | McNeece | 33/533 |
| 3,895,446 | 7/1975 | Orlov et al. | 33/533 |
| 4,233,745 | 11/1980 | Ramon et al. | 33/553 X |

Primary Examiner—William D. Martin, Jr.
Attorney, Agent, or Firm—Flehr, Hohbach, Test, Albritton & Herbert

[57] ABSTRACT

A coplanarity tester for surface mounted devices is disclosed. The coplanarity tester provides an electromechanical means and method for assuring the coplanarity of surface mounted devices to be within any given specification. The tester measures the coplanarity of a surface mounted device where the plane is defined by the three longest leads of that device. The present invention provides an indication of whether a surface mounted device has coplanarity within a predetermined thickness. The present invention can be utilized with any surface mounted device such as a gull-wing or j-bend type device.

6 Claims, 3 Drawing Sheets

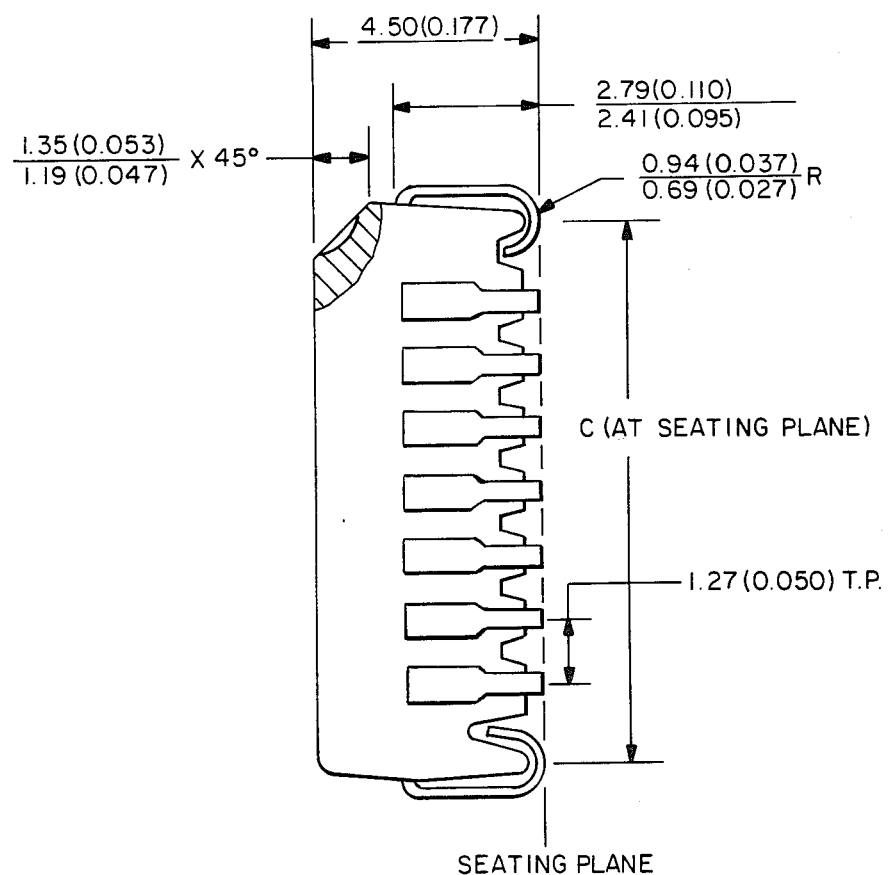
FIG.—1
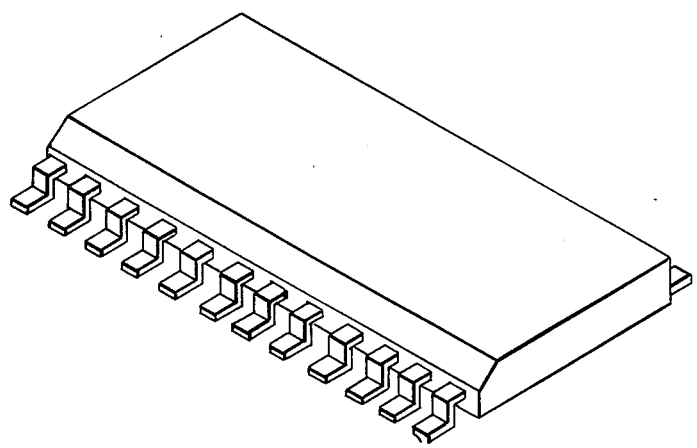
FIG.—2

COPLANARITY TESTER FOR SURFACE MOUNTED DEVICE

BACKGROUND OF THE INVENTION

The present invention relates to an electromechanical apparatus and method for assuring the coplanarity of the leads of surface mounted devices to any given specification.

In the field of printed circuit board assembly, surface mounted devices are rapidly replacing devices that are mounted through holes in the printed circuit board. The advantages of surface mounted devices is that they take up less room on the board and they do not need plated through holes in the board, all of which means lower cost.

One of the more serious problems existing with surface mounted devices is that the contact points of the leads don't always lie in the same plane. Thus, when a surface mounted device lies on a printed circuit board, some of the leads are so high off the solder paste on the circuit board that they do not make connection to the circuit board when the solder is reflowed by heat. See, for example, the article entitled "The Effect of Lead Coplanarity on PLCC Solder Joint Strength," by William D. Smith, SURFACE MOUN TECHNOLOGY, June, 1986.

One present method used to check the coplanarity of surface mounted devices before they are assembled to printed circuit boards incorporates the use of vision systems. Using four cameras, one for each side, or one camera and a means for rotating the package, the vision systems can measure the relative position of the leads with respect to each other.

One disadvantage of this method is the inaccuracy in calibrating the position of each of the four cameras or the inaccuracy in rotating a package in a plane. The systems are also slow because they are measuring and comparing, and their speed is dependent on the number of leads in a device.

SUMMARY OF THE INVENTION

It is an object of the present invention to provide an improved coplanarity tester for surface mounted devices.

Briefly, the coplanarity tester, according to the present invention, comprises first and second electrically conductive plates and conductive spring means oriented between said first and second plates such as to make an electrical connection between said first and second plates under initial conditions.

The conductive spring means include a plurality of electrical arms, each of which can be biased away from the first plate when sufficient force is applied to a corresponding one of a plurality of non-conductive pins which are oriented to engage a respective one of the conductive spring electrical arms.

The coplanarity tester further includes non-conductive spacer means having a predetermined thickness and oriented between said first and second plates.

The coplanarity tester further includes means for indicating whether a surface mounted device has a sufficient coplanarity within the predetermined thickness when the leads of the surface mounted device are applied to the non-conductive pin means with a sufficient force, such as to disengage the conductive spring means from the first upper plate.

Other objects, features and advantages of the present invention will become apparent following detailed description when taken in conjunction with the accompanying drawings.

BRIEF DESCRIPTION OF THE DRAWINGS

FIG. 1 depicts a view of a typical j-bend surface mounted device.

FIG. 2 depicts a view of a typical gull-wing surface mounted device.

DETAILED DESCRIPTION OF THE DRAWINGS

The present invention relates to an electromechanical means and method of rejecting surface mounted devices that exceed a given coplanarity specification. It is a go/no-go comparator that can screen all types of surface mounted devices, j-bend or gull-wing, and its speed is the same for devices with many leads as it is for a device with few leads. No electrical voltages or currents are applied to the device leads; they are electrically grounded at all times.

FIG. 1 shows a view of a typical j-bend surface mounted device, and FIG. 2 shows a view of a typical gull-wing surface mounted device. The physical dimensions, tolerances and coplanarity specifications that are called out for such devices are well known in the art.

Figure 3:
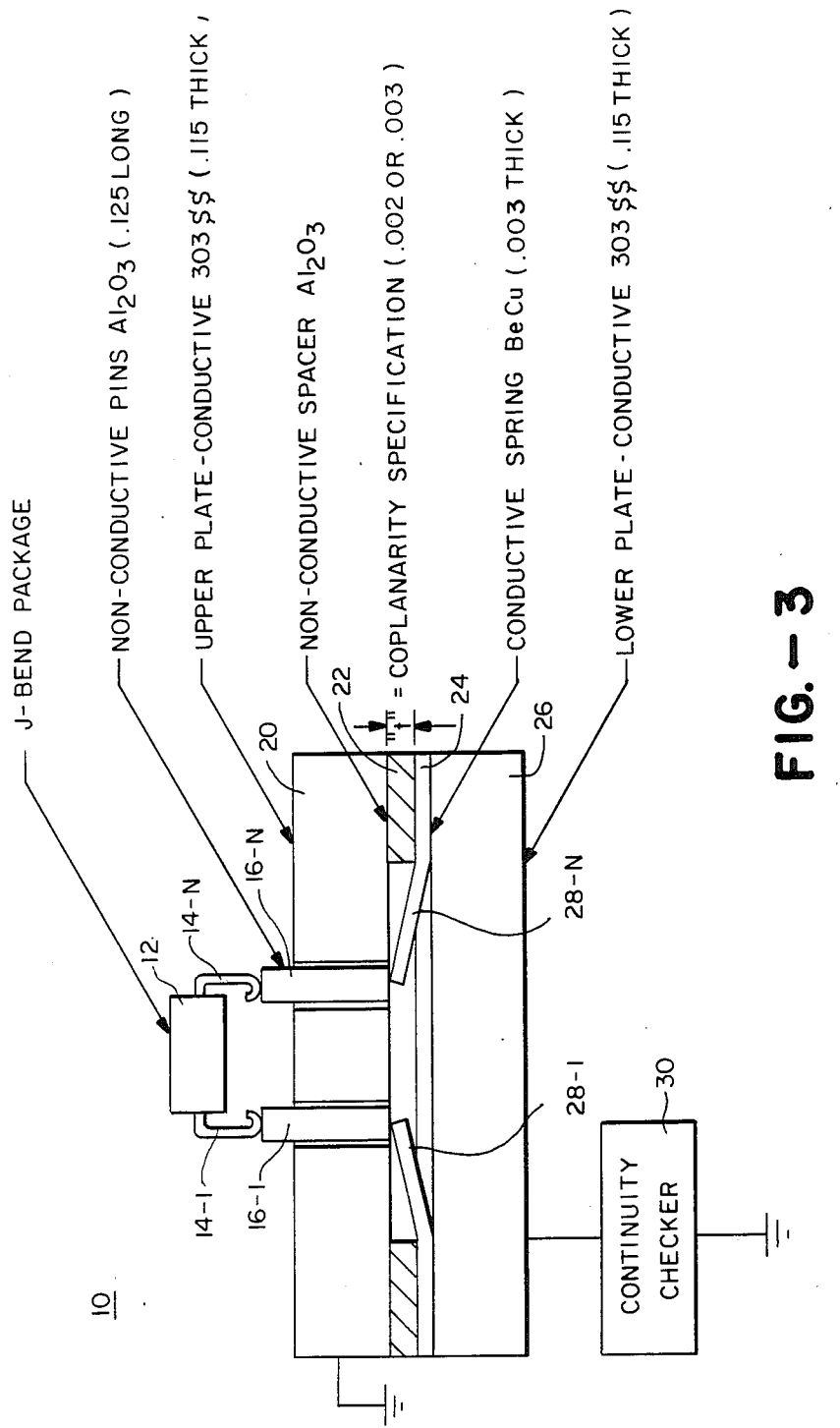
FIG. 3 depicts a cross-sectional view of the present invention.

FIG. 3 shows a cross-sectional view of the present invention, together with the component specifications for the coplanarity tester. As can be seen in FIG. 3, the lower plate 26 makes electrical connection to the upper plate 20 through the conductive spring means 24 when there is no device placed in the tester 10. For purposes of discussion, the surface mounted device to be tested will be assumed to be a j-bend package. However, the aspects of the present invention apply to all aspects of surface mounted devices.

When a surface mounted device 12 is placed in the tester 10 and pushed down with sufficient force to overcome the force of the conductive spring arms (arms 28-1 through 28-N), at least three of the spring arms 28 will rest on the upper surface of the lower plate 26. This is because the three longest leads 14 of the package 12 will define a plane that the leads 14 will rest on. The device 12 depicted in FIG. 3 has N leads, identified as leads 14-1, ... ,14-N.

In operation, the coplanarity tester 10 of FIG. 3 includes a conductive upper plate 20 which is oriented above a second conductive plate 26.

The desired coplanarity spacing is provided by a non-conductive spacer 22 which can be of any desired thickness "t".

Figure 6:
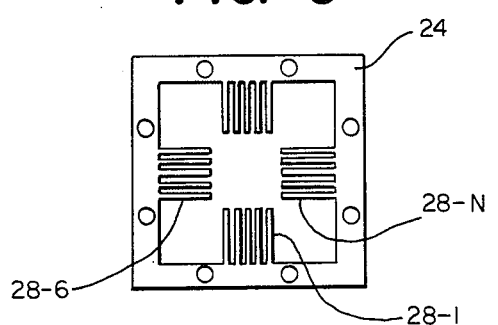
FIG. 6 depicts a top field of a conductive spring which forms a portion of FIG. 3.

The conductive spring 24 includes a plurality of electrically conductive arms 28-1 through 28-N, which is depicted in more detail in FIG. 6.

Referring again to FIG. 3, the coplanarity tester also includes a plurality of non-conductive pins 16-1 through 16-N, which correspond to the electrical arms 28 of conductive spring 24.

The coplanar tester 10 also includes a continuity checker 30, which is a suitable indicating means for providing whether electrical contact is still made by conductive spring 24 (a go/no-go comparator). As indicated in FIG. 3, the tester 10 is electrically grounded.

The non-conductive pins 16 are made of $Al_2O_3$ and are approximately 0.125 inches in length.

The conductive plates 20, 26 are made of 303SS and are both approximately 0.115 inches in thickness.

The non-conductive spacer is made of $Al_2O_3$ and has a thickness depending upon the coplanarity specification (e.g., 0.002 a 0.004).

The conductive spring 24 is BeCu and is approximately 0.003 inches in thickness.

The tester 10 is depicted in FIG. 3 with a suitable surface mounted device 12 (such as a j-bend package) with appropriate leads 14-1 through 14-N. The leads are in the form of a j configuration (hence the name "j-bend package").

The leads 14-1 through 14-N are applied to corresponding non-conductive pins 16-1 through 16-N with a suitable force so as to apply a bias to the respective arms 28-1 through 28-N of conductive spring 24.

Figure 4:
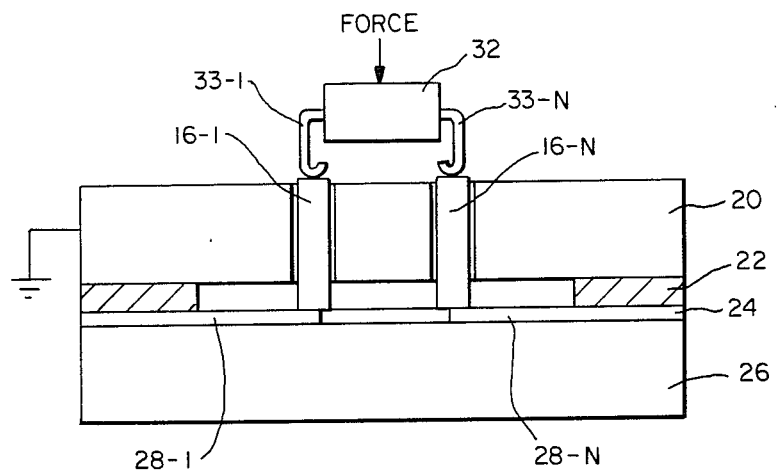
FIG. 4 depicts a configuration utilizing the present invention where all the leads of the surface mounted device are perfectly coplanar.
Figure 5:
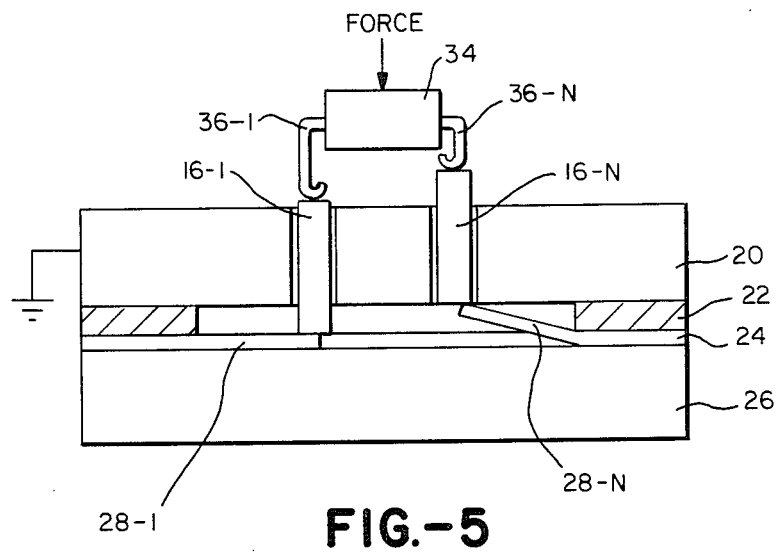
FIG. 5 depicts a configuration utilizing the present invention where the leads of the surface mounted device are not coplanar.

If all of the leads of the device were perfectly coplanar, all of the spring arms 28-1 through 28-N would rest on the upper surface of the lower plate 26. This is depicted in FIG. 4. The upper and lower plates 20, 26 would then be electrically isolated from each other. If, however, any lead 33 of a device 34 was off the plane formed by the three longest leads 36 (the plane that the package will rest on) by more than the thickness of the non-conductive spacer 22, then electrical continuity would still be maintained between the upper plate 20 and the lower plate 26, because at least one of the conductive spring arms 28 would still be in contact with the upper plate 20. This is depicted in FIG. 5, where arm 28-1 is still in electrical contact with plate 20.

FIG. 6 depicts a top view of one arrangement of the conductive spring 28 of FIG. 3. The spring 28 includes a plurality of electrical arms 28-1, . . . , 28-N, which correspond to the particular lead of the surface mounted device to be tested.

Thus, coplanarity can be guaranteed to be within the thickness of the non-conductive spacer 22, which can be made to any dimension. If the lead coplanarity is within the thickness "t", all conductive spring arms 28 will be separated from the upper plate 20, and there will be no conductivity measured between the upper plate 20 and lower plate 26. If the lead coplanarity exceeds the thickness "t", there will still be at least one spring arm 28 that will not be separated from the upper plate and there will be continuity between the upper and lower plates.

The present invention provides an electromechanical means and method for assuring the coplanarity of a surface mounted device to be within a predetermined specification. Surface mounted devices can be sorted where the sorting speed is independent of the number of leads in the device.

The present invention provides an electromechanical means and method for assuring the coplanarity of surface mounted devices that check the coplanarity in the same manner that coplanarity is significant to guarantee that it will solder to a printed circuit board or any other surface it is to be mounted to and measures coplanarity from the plane defined by the three longest leads of the surface mounted device.

What is claimed is:

1. A coplanarity tester for surface mounted devices comprising
    first and second electrically conductive plates,
    a conductive spring oriented between said first and second plates such as to make an electrical connection between said first and second plates in normal operation,
    a plurality of non-conductive pins,
    said conductive spring including a plurality of arms corresponding to each of said non-conductive pins where each of said arms can be biased away from said first plate means when sufficient force is applied to said non-conductive pins, so as to break the electrical connection between said arms and said first plate,
    a non-conductive spacer having a predetermined thickness and oriented between said first and second plates, and
    means for indicating whether a surface mounted device has coplanarity within said predetermined thickness when said device is applied to said non-conductive pins with sufficient force so as to break said electrical connection.

2. The tester as in claim 1 wherein said surface mounted device has a plurality of leads and wherein said plurality of non-conductive pins correspond to said plurality of leads on said surface mounted device.

3. The tester as in claim 2 wherein said surface mounted device is defined by the plane of the three longest leads of said device, and wherein the coplanarity to be measured is said plane defined by the three longest leads of said surface mounted device.

4. The tester as in claim 2 wherein said surface mounted device is a gull-wing device.

5. The tester as in claim 2 wherein said device is a j-bend device.

6. In a coplanarity tester for surface mounted devices which includes first and second electrically conductive plates,
    a conductive spring oriented between said first and second plates such as to make an electrical connection between said first and second plates in normal operation,
    a plurality of non-conductive pins,
    said conductive spring means including a plurality of arms corresponding to each of said non-conductive pins where each of said arms can be biased away from said first plate means when sufficient force is applied to said non-conductive pins so as to break the electrical connection between said arms and said first plate,
    a non-conductive spacer having a predetermined thickness and oriented between said first and second plates, the method comprising the steps of
    indicating whether a surface mounted device has coplanarity within said predetermined thickness when said device is applied to said non-conductive pins with sufficient force so as to break said electrical connection.

* * * * *